W. RALPH.
Cheese Vat.
No. 30,156.
Patented Sept. 25, 1860.
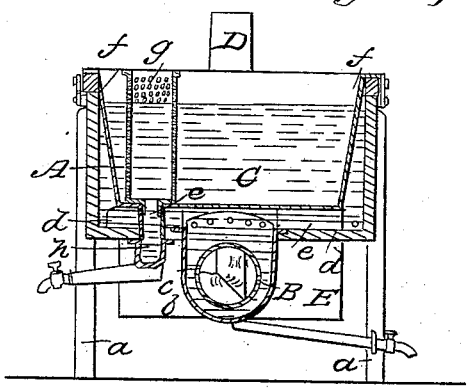
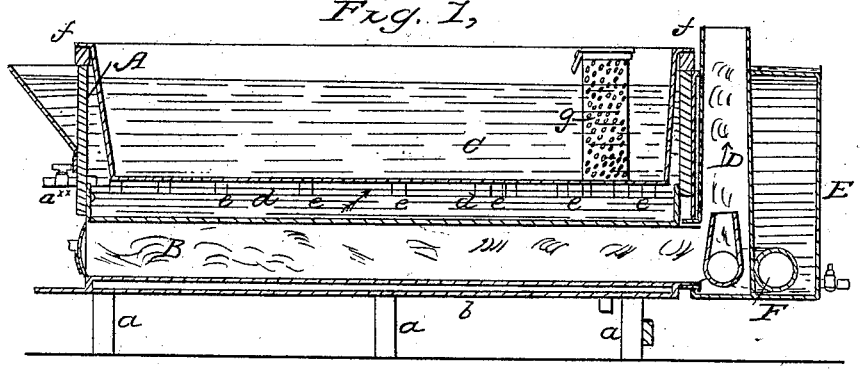
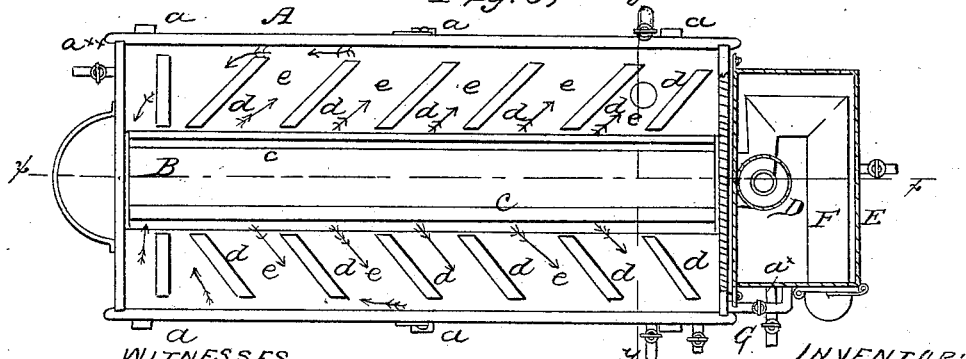

UNITED STATES PATENT OFFICE.

WILLIAM RALPH, OF HOLLAND PATENT, NEW YORK.

CHEESE-VAT.

Specification of Letters Patent No. 30,156, dated September 25, 1860.

*To all whom it may concern:*

Be it known that I, WILLIAM RALPH, of Holland Patent, in the county of Oneida and State of New York, have invented certain new and useful Improvements in Cheese-Vats; and I do hereby declare that the following is a full, clear, and exact description of the same, reference being had to the accompanying drawings, making a part of this specification, in which—

Figure 1 is a longitudinal vertical section of my invention taken in the line $x$, $x$, Fig. 3; Fig. 2, a transverse vertical section of the same taken in the line $y$, $y$, Fig. 3; Fig. 3, a plan or top view of the same.

Similar letters of reference indicate corresponding parts in the several figures.

This invention has for its object the subjecting of the milk in the inner vat to an equal or uniform heat so that the whole mass will be quickly brought to the desired temperature favorable for coagulation.

The invention also has for its object a ready means for re-supplying for a second coagulating process of the milk, the water chamber or the water-space between the inner and outer vats, with warm water after the withdrawing of the previously heated water and the substitution of cold water for the purpose of cooling or setting the curd; said means also furnishing a supply of properly heated water for the proper cleansing of various articles pertaining to cheese-making.

The invention has further for its object the keeping of the milk at a proper low temperature to preserve the same in suitable condition a convenient length of time in warm weather.

To enable those skilled in the art to fully understand and construct my invention I will proceed to describe it.

A, represents a rectangular box which is supported at a suitable height by legs $a$, and has a stove or heater B, placed longitudinally at its bottom extending its whole length and encompassed by a metal jacket $b$, which causes the heater to be contained within a recess $c$, at the bottom of the box A, a space being allowed all around between the heater and jacket as shown clearly in Fig. 2.

The box A, is the outer vat, and constitutes the water chamber and its bottom at each side of the recess $c$, has oblique slats $d$, secured to it as shown clearly in Fig. 3. These slats $d$, with the exception of the front ones have all an oblique position and the inner vat C, rests on them as shown clearly in Fig. 1, and passages $e$, are formed between the slats. The inner vat C, may be constructed of sheet metal and it is of quadrilateral form gradually decreasing in dimensions from its upper to its lower end. The upper end of vat C, is provided with a flanch or ledge $f$, all around it which projects over the top of the outer vat A, as shown clearly in Figs. 1, and 2. The vat C, is provided with the usual strainer $g$, and discharge pipe $h$, by which the whey is allowed to pass out from the vat C, after the milk has been fully coagulated.

To the back end of the stove or heater B, the smoke pipe D, is attached. This pipe extends up through a vessel or chamber E, which is secured to the end of the vat A, but does not communicate with the smoke pipe. Within the chamber E, there is placed a heater F, the flue of which communicates with the lower part of the smoke pipe D. G, is a pipe which leads from the chamber E, into the vat A, said pipe being provided with a stop cock $a^x$, see Fig. 3.

The operation is as follows: The milk in the vat C, is brought to the proper temperature by the water in the vat A, said water being heated by the stove or heater B. This water has a circulation given it by the strips $d$, in the direction indicated by the arrows, the warm water passing outward from the heater and backward so as to allow the cool portion to pass toward the front end of the heater and in contact with the fire surface which is at its front end, the back part being simply the flue. By this arrangement the milk in the vat C, will be uniformly and quickly heated and brought to a proper temperature favorable for coagulation and the consequent production of the curd. The bringing of the water in the vat A, in direct contact with the heater B, the whole length of the vat, of course has a tendency to quickly heat the water the result being obtained far quicker than when the outer part communicates with an external boiler by means of pipes.

The chamber E, when filled with water, has its water heated by the stove or heater B, and when it is necessary to withdraw the heated water from A, and substitute cold water in order to cool or set the curd in C, the warm water in E, answers as a reserve, so that when the vat C, is again supplied with milk to be warmed, warm water can be immediately introduced into A, from E, and the delay occasioned by introducing cold water into A, and heating it to the desired degree avoided. Again, the water in chamber E, may by means of heater F, be increased in temperature so that it can be used for cleansing articles or vessels used in the process of cheese making. This is an essential feature, for scalding water 212° is required to thoroughly cleanse said articles and this cannot be conveniently obtained in the apartment where the vat is placed, as a separate stove for the purpose would have a tendency to raise the temperature of the apartment and render the same unfavorable for cheese-making.

During warm weather milk, in order to be kept in a cool state until desired for use, has hitherto required considerable attention. Cool water is placed into the outer vat for this purpose, and the water changed from time to time as its temperature rises. In order to avoid this difficulty ice may be placed in the chamber E, and the latter thereby converted into a refrigerator a current of cold water being made to pass through the vat A, said water passing into the vat through pipe G, and out from it through a pipe $a^{xx}$.

Having thus described my invention what I claim as new and desire to secure by Letters Patent is—

The arrangement of the tank heater F, to discharge into the chimney D, when both the said heater and chimney are made to pass through the tank E, all as herein shown and described for the purpose set forth.

WM. RALPH.

Witnesses:
JOHN CANDE,
J. T. THOMAS.